United States Patent [19]
Gal et al.

[11] Patent Number: 5,650,873
[45] Date of Patent: Jul. 22, 1997

[54] MICROPOLARIZATION APPARATUS

[75] Inventors: George Gal, Palo Alto; Bruce J. Herman, Mountain View, both of Calif.

[73] Assignee: Lockheed Missiles & Space Company, Inc., Sunnyvale, Calif.

[21] Appl. No.: 476,318

[22] Filed: Jun. 7, 1995

Related U.S. Application Data

[63] Continuation-in-part of Ser. No. 406,720, Mar. 20, 1995, which is a continuation-in-part of Ser. No. 380,109, Jan. 30, 1995, Pat. No. 5,600,486.

[51] Int. Cl.⁶ ............... G02B 5/30; G02B 27/28
[52] U.S. Cl. ............ 359/487; 359/494; 359/495; 359/496; 359/499
[58] Field of Search ............... 359/487, 494, 359/495, 496, 499, 498

[56] References Cited

U.S. PATENT DOCUMENTS

| | | | |
|---|---|---|---|
| 2,748,659 | 6/1956 | Geffcken et al. | 359/495 |
| 2,821,114 | 1/1958 | Wiemer et al. | 359/495 |
| 3,876,285 | 4/1975 | Schwarzmüller | 359/495 |

FOREIGN PATENT DOCUMENTS

| | | | |
|---|---|---|---|
| 422661 | 4/1991 | European Pat. Off. | 359/495 |
| 508413 | 10/1992 | European Pat. Off. | 359/487 |
| 9660009 | 7/1957 | Germany | 359/487 |
| 1092686 | 11/1960 | Germany | 359/487 |
| 296391 | 4/1954 | Sweden | 359/487 |

*Primary Examiner*—Ricky D. Shafer
*Attorney, Agent, or Firm*—Feix & Feix; Henry Groth; Mark Bielawski

[57] ABSTRACT

A micropolarization assembly has a beam-shaping microlens wafer and a polarization wafer assembly. The micropolarization assembly utilizes the full illumination incident on the beam-shaping microlens wafer and aligns all of the light to the same polarization at the outlet of the micropolarization wafer assembly.

1 Claim, 9 Drawing Sheets

FIG_1
PRIOR ART
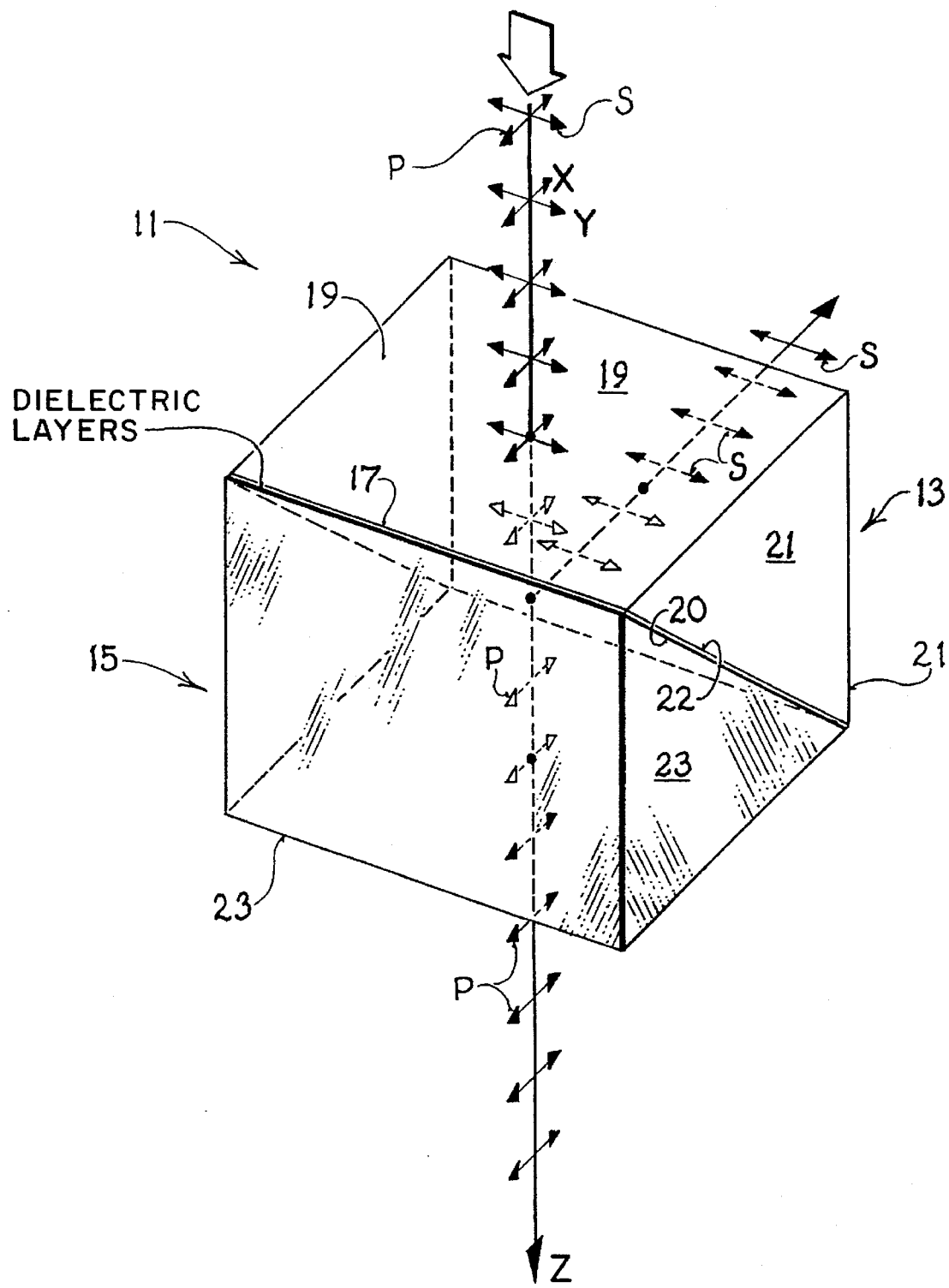

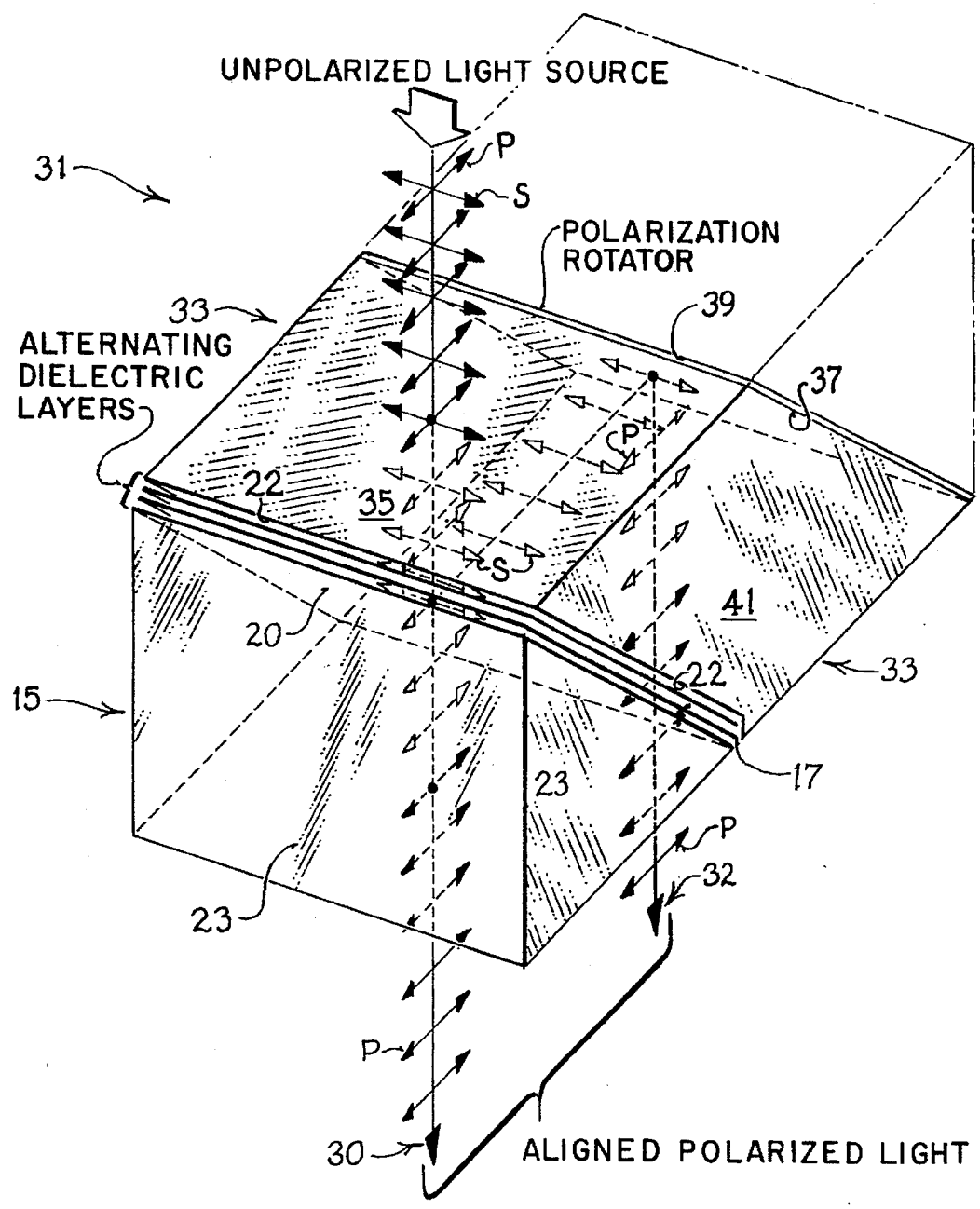

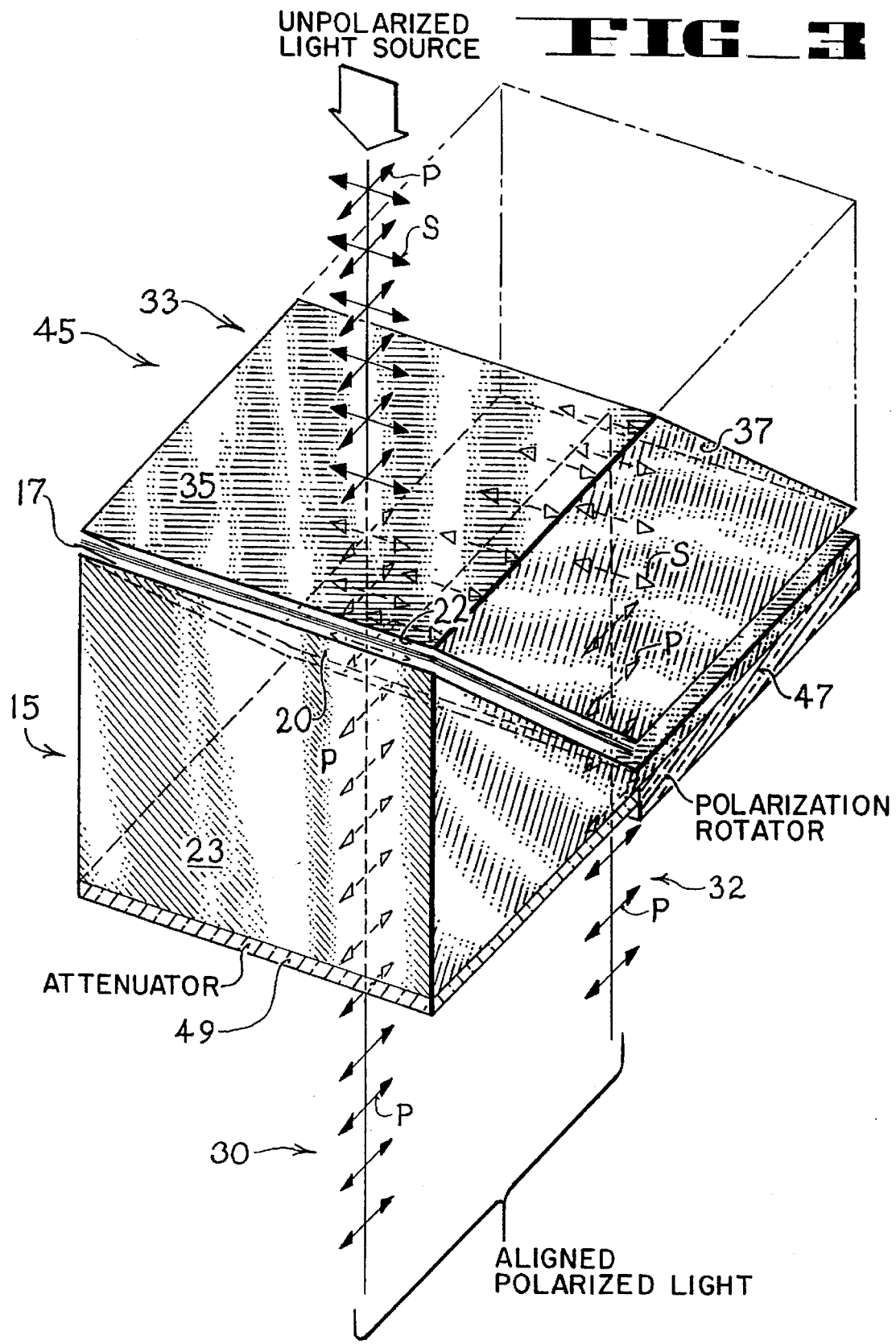
FIG_3

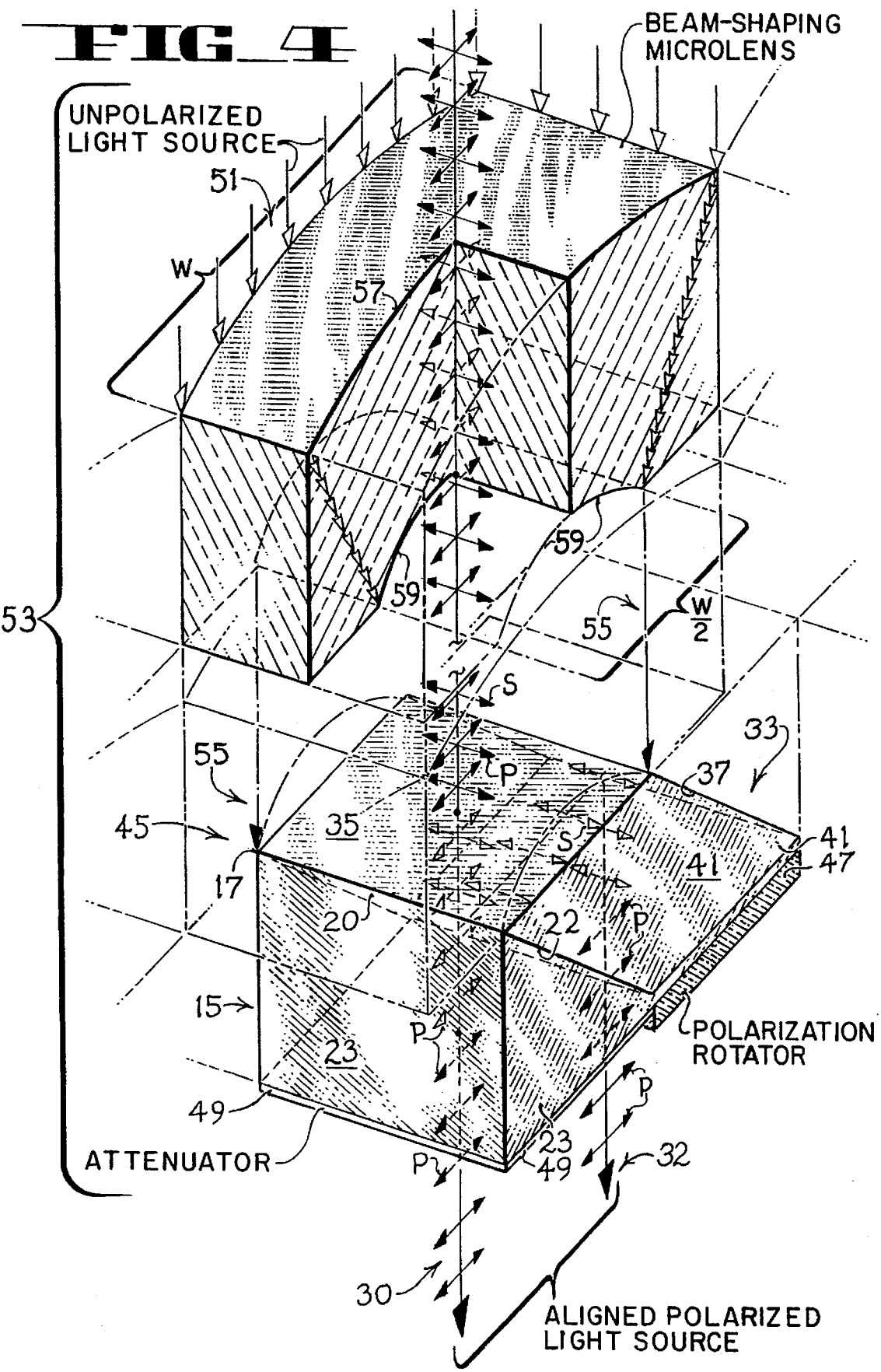

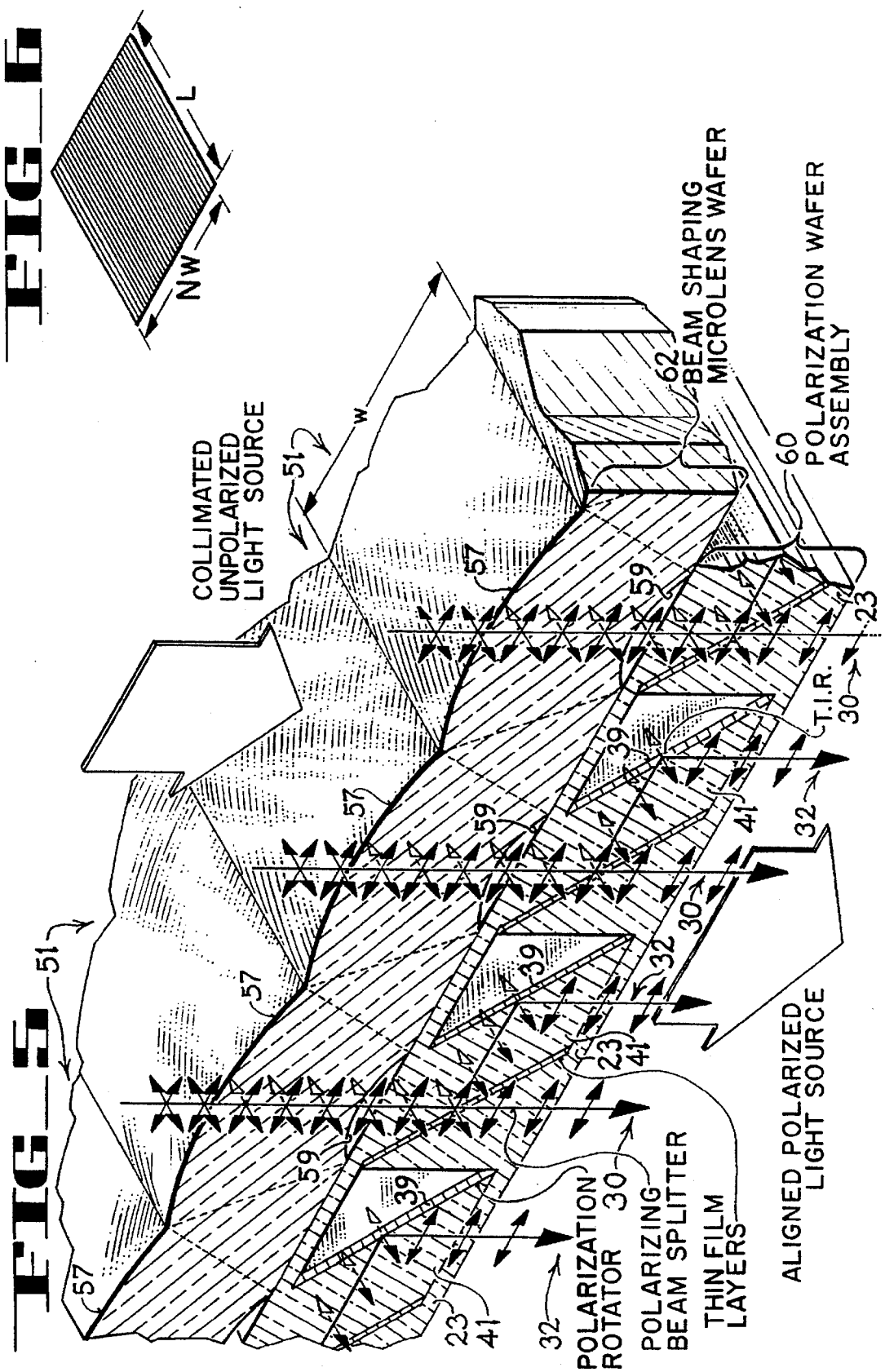

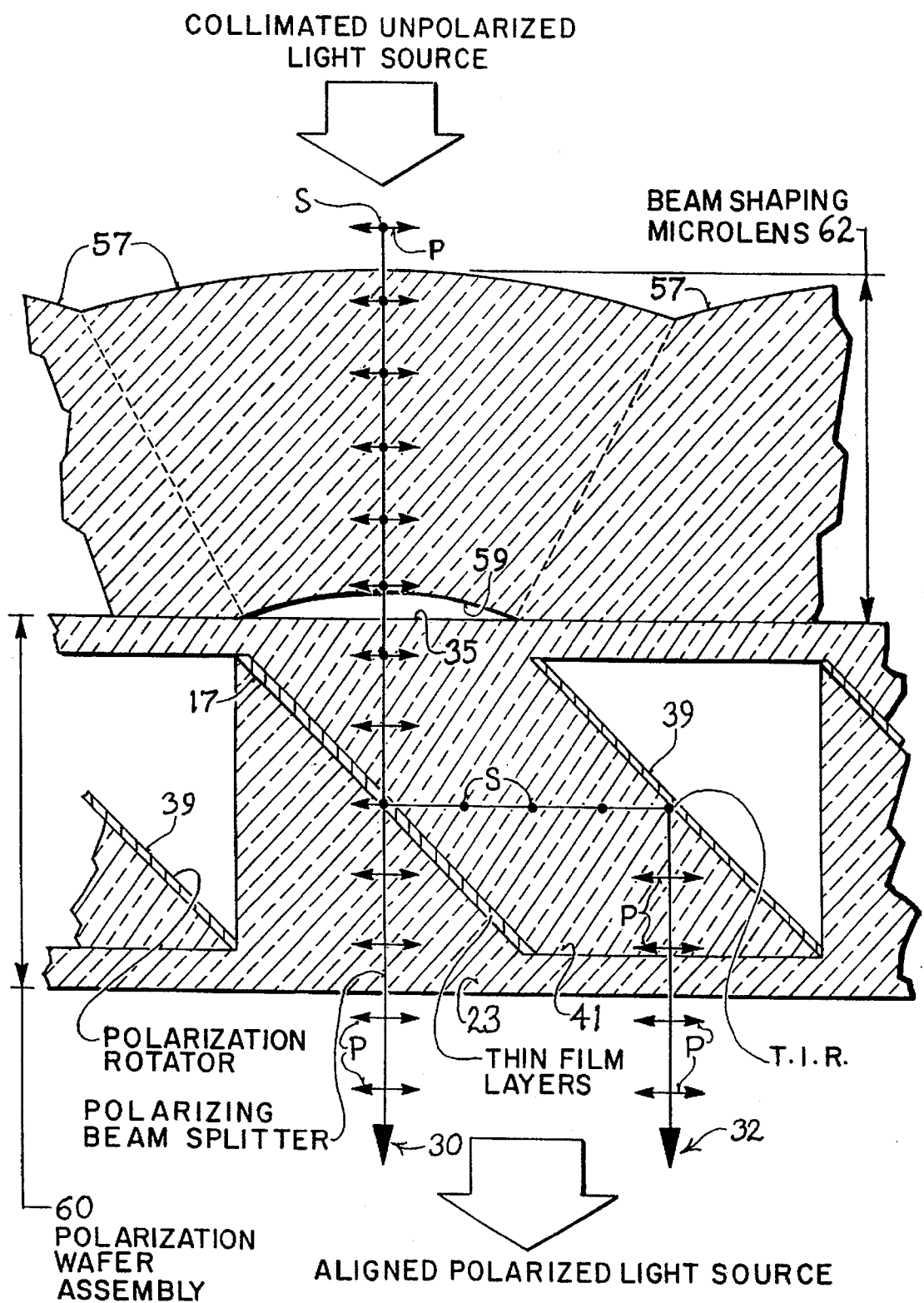

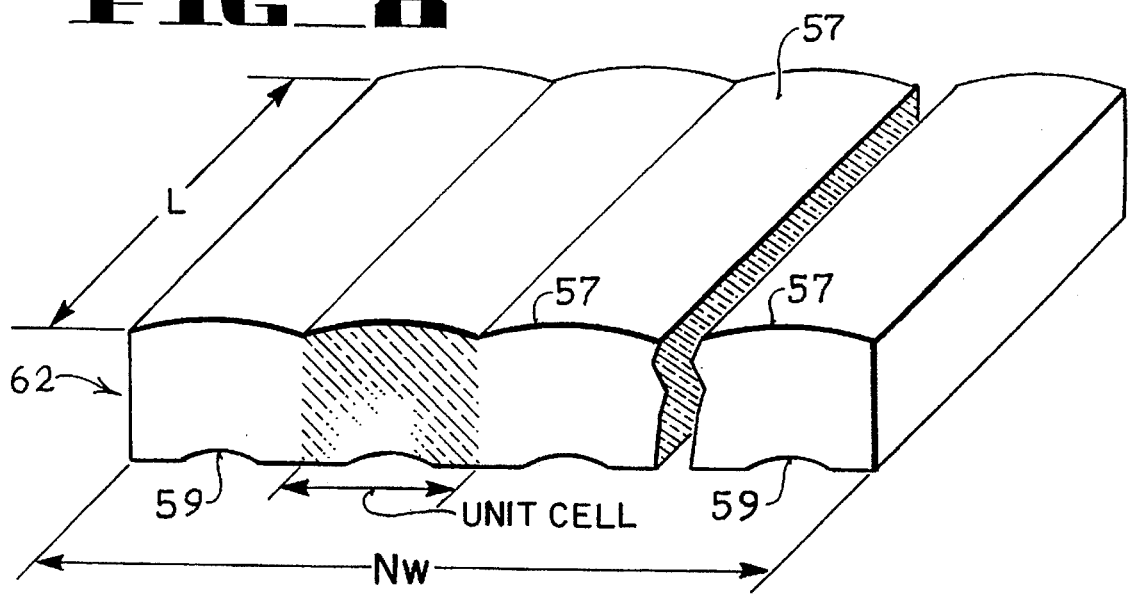
FIG_8
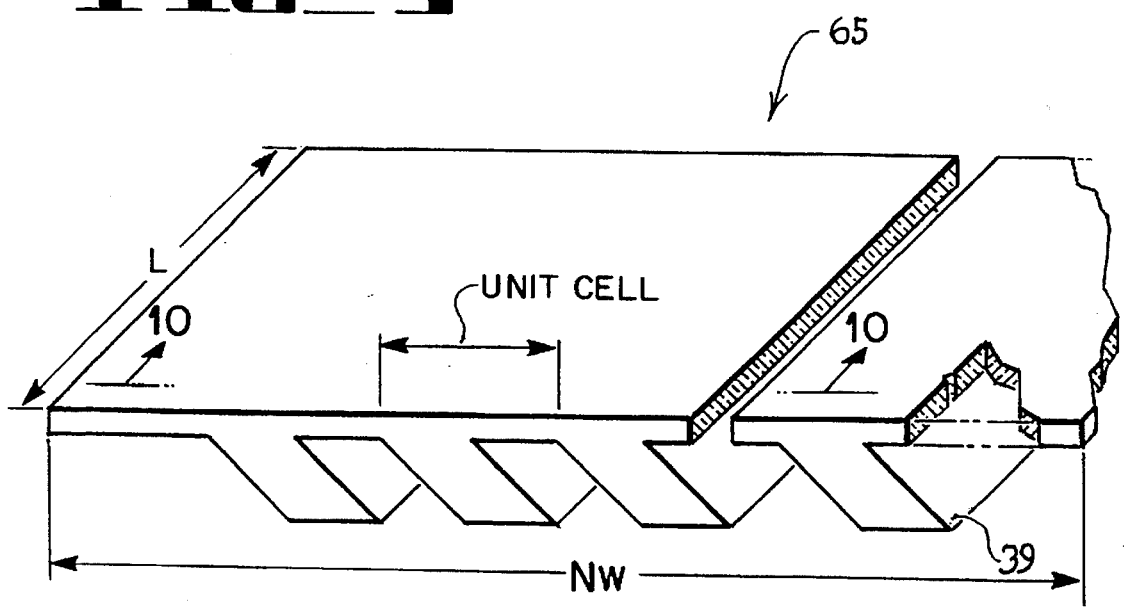
FIG_9
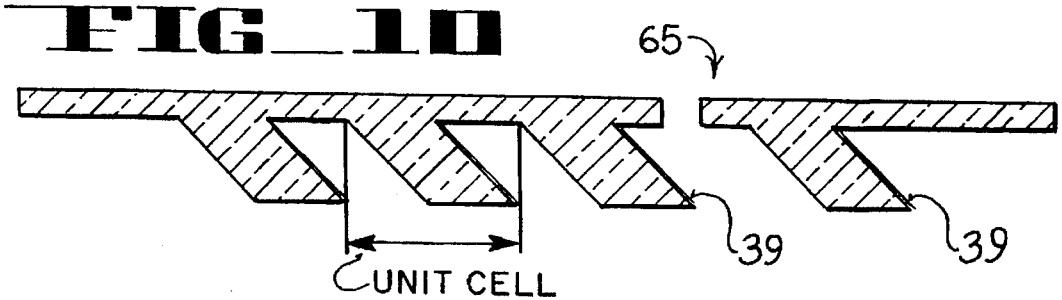
FIG_10

OUTPUT-POLARIZED LIGHT

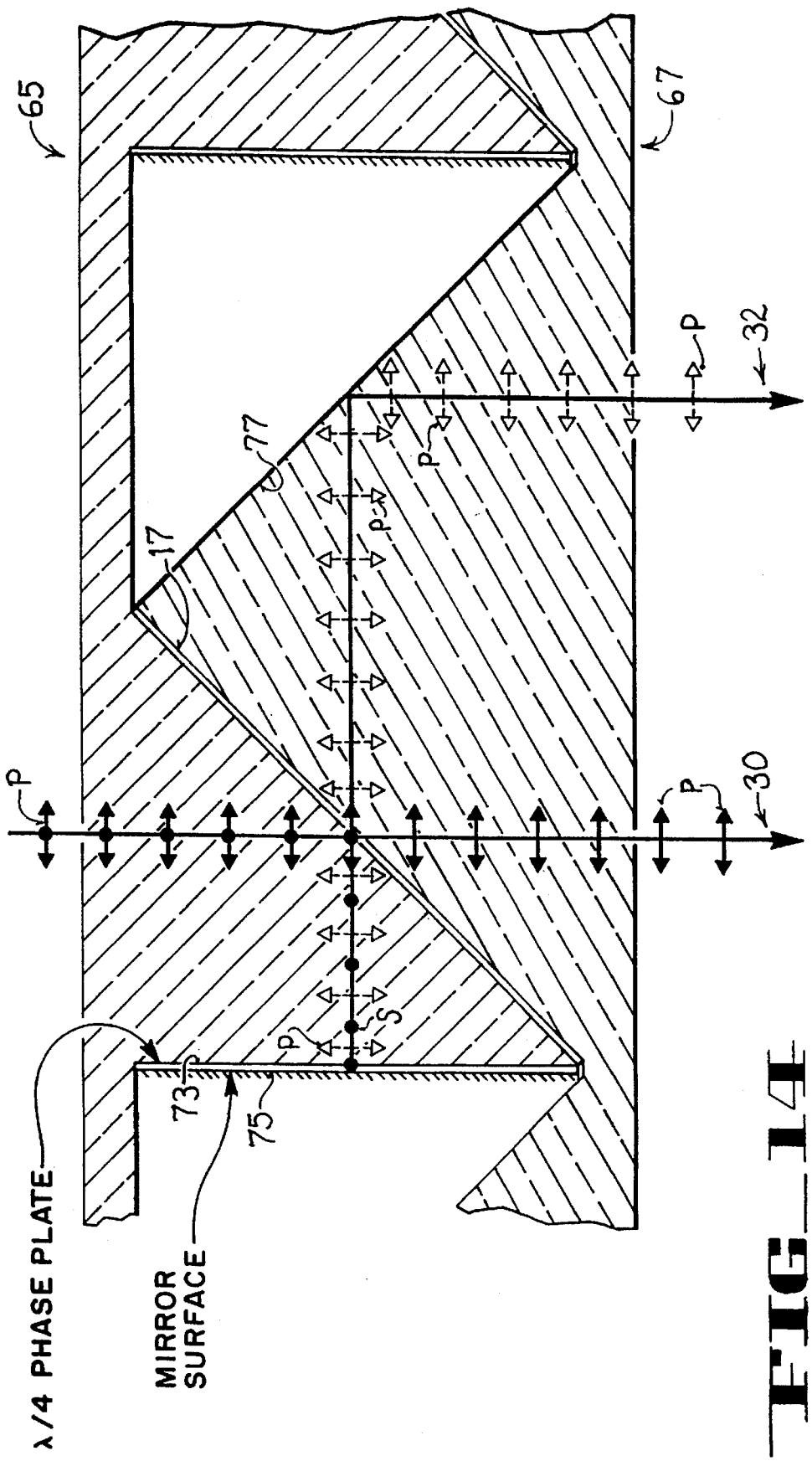
FIG_14

MICROPOLARIZATION APPARATUS

RELATED U.S. PATENT APPLICATION

This application is a continuation in part of pending U.S. application Ser. No. 08/406,720 filed Mar. 20, 1995 by George Gal and Bruce J. Herman (inventors) and entitled "Flat Panel Display" and assigned to the same assignee as the assignee of this application. Pending U.S. application Ser. No. 08/406,720 filed Mar. 20, 1995 is a continuation in part of U.S. Ser. No. 08/380,109 filed Jan. 30, 1995, now U.S. Pat. No. 5,600,486, by George Gal and Bruce J. Herman and entitled "Color Separation Microlens". This application for "Micropolarization Apparatus" claims the benefit of the Mar. 20, 1995 filing date of the subject matter common to the parent application Ser. No. 08/406,720 and this application.

BACKGROUND OF THE INVENTION

This invention relates to a polarization apparatus for receiving a single beam of unpolarized light at an inlet and for producing two beams of a single polarized light at an outlet of the apparatus.

This invention relates particularly to a micropolarization assembly which incorporates a beam-shaping microlens wafer and a polarization wafer assembly. The micropolarization assembly utilizes the full illumination incident on the beam-shaping microlens wafer and aligns all of the light to the same polarization at the outlet of the polarization wafer assembly.

The invention relates particularly to a micropolarization assembly which enables a larger area device to be fabricated as a relatively thin assembly.

SUMMARY OF THE INVENTION

Polarization apparatus constructed in accordance with the present invention includes a polarizing component which receives a single beam of collimated unpolarized light at an input and which produces two adjacent beams of light having a single polarization at the output.

The two adjacent beams at the output have the same polarization and propagate in the same direction as the input light.

The polarizing component has a beam splitter which transmits the existing p polarization light directly to the output and which reflects the s polarization light at a 90° angle.

The s and p polarizations are aligned in x and y coordinates (in an x-y-z coordinate system).

The polarizing component recovers the reflected s polarization light and converts the recovered s polarization light to p polarization light. This p polarization light is transmitted (in the z coordinate direction) as a second beam of light at the output.

The polarizing component transmits substantially all of the light received at the input to the output, and the polarizing component produces two beams of single polarized light at the output propagated in the same direction and without a gap between the beams.

The polarizing apparatus constructed in accordance with the present invention incorporates a unit cell. The unit cell includes the polarizing component described above and also includes a beam-shaping component.

The beam-shaping component contracts the incoming light beam to half its width and sends the light as a single beam to the inlet of the polarizing component.

The combined width of the two beams at the outlet of the polarizing component is the same as the width of the light beam which enters the beam-shaping component.

The physical extent of the light beam entering the beam-shaping component is exactly the same as the physical extent of the light beam output from the polarizing component.

The unit cell utilizes full illumination by converting all of the light to the same polarization.

The unit cell is incorporated as a basic building block in a micropolarization assembly constructed in accordance with the present invention.

The micropolarization assembly comprises a beam-shaping microlens wafer and a polarization wafer assembly.

In this micropolarization assembly a plurality of the unit cells are fabricated side by side across the width of the wafers. The individual unit cells extend linearly along the entire length of the wafers.

The beam-shaping component in this micropolarization assembly is a cylindrically shaped condensing microlens. The upper surface is a cylindrically curved surface. A portion of the lower face has a cylindrically curved surface which is one half of the width of the upper surface. This cylindrically curved lower surface is aligned with the inlet face of a related polarizing component of the unit cell.

This micropolarization wafer assembly utilizes full illumination by converting all light to the same polarization.

Polarizing apparatus and micropolarization assemblies and methods which incorporate the features described above and which are effective to function as described above constitute specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view of a prior art polarizing beam splitting cube which is used to separate the two orthogonal polarization components (s and p) of incident light.

FIG. 2 is an isometric view of one embodiment of a polarizing component constructed in accordance with the present invention. The polarizing component shown in FIG. 2 separates the s and p polarization components of a single beam of incoming light and also recovers the reflected s polarized light and converts the recovered s polarized light to p polarized light to produce two, immediately adjacent, side by side, beams of single polarized light at the outlet of the polarizing component. The polarizing component shown in FIG. 2 is a basic unit of a polarization wafer assembly which is shown in FIGS. 5 and 7.

FIG. 3 is an isometric view of a second embodiment of a polarizing component constructed in accordance with the present invention.

FIG. 4 is an exploded, isometric view showing the polarizing component of FIG. 3 and also shows how a beam-shaping microlens component is operatively associated with the polarizing component. The beam-shaping microlens component contracts the incoming light beam to half its width and sends the light beam as a single beam to an inlet of the polarizing component. The beam-shaping microlens component and the polarizing component comprise a unit cell which is the basic building block of the micropolarization assembly of the present invention.

FIG. 5 is a fragmentary, isometric view, partly in cross-section to show details of the construction, of a polarization wafer assembly and a beam-shaping microlens wafer as assembled. The micropolarization wafer apparatus shown in FIG. 5 is made up of a plurality of integrated, side by side, linearly extending, unit cells comprising the polarizing component (of FIG. 2 or FIG. 3) and the beam-shaping component (illustrated in FIG. 4). Each polarizing component is fabricated in a polarization wafer assembly, and each associated beam-shaping component is fabricated in a beam-shaping wafer in a way such that each unit cell (of those two components) extends linearly along the entire lengths of the wafers.

FIG. 6 is an isometric view, looking at the top side, of a micropolarizer assembly of the present invention. FIG. 6 shows how the plurality of the unit cells (each comprising a beam-shaping component and an associated polarizing component) are arranged in N rows. Each associated beam-shaping component and polarizing component has a width W and extends the entire length L of the assembled wafers.

FIG. 7 is a fragmentary, enlarged, end view of a portion of the beam-shaping microlens wafer and the polarization wafer assembly shown in FIG. 5. FIG. 7 shows details of how polarized light is transmitted through one unit cell (a unit cell like that illustrated in the exploded, isometric view of FIG. 4).

FIGS. 8, 9 and 11 are isometric views of the three individual wafers which are assembled to provide the micropolarization wafer apparatus shown in FIG. 5. FIGS. 8, 9 and 11 are fragmentary views and are broken away in parts to show details of construction.

FIG. 8 shows the beam-shaping microlens wafer.

FIG. 9 shows the upper wafer of the polarization wafer assembly.

FIG. 10 is an elevation view, in cross section, taken along the line and in the direction indicated by the arrows 10—10 in FIG. 9.

FIG. 11 shows the lower wafer of the polarization wafer assembly.

FIG. 14 is an end elevation view in cross section showing a third embodiment of a polarizing component constructed in accordance with the present invention.

DETAILED DESCRIPTION OF THE PREFERRED EMBODIMENTS

Figure 11:
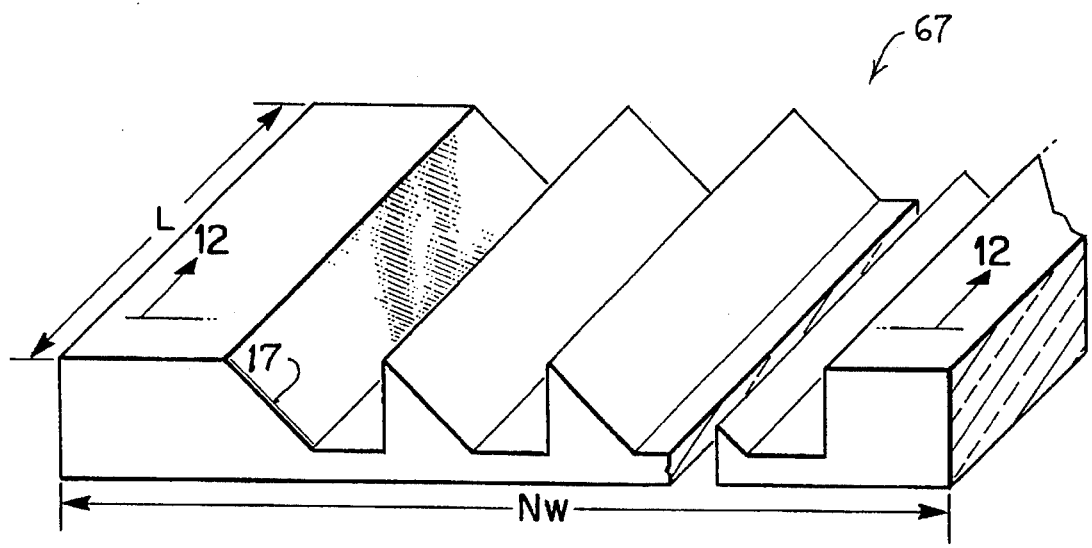

FIG. 1 is an isometric view of a prior art polarizing beam splitting cube which is used to separate the two othogonal polarization components (s and p) of incident light. As illustrated in FIG. 1 the s and p polarizations are aligned with the y and x coordinates (of an x-y-z orthogonal coordinate system) and the input light propagates in the z direction.

In FIG. 1 the prior art polarizing beam splitting cube is indicated generally by the reference numeral 11.

The polarizing beam-splitting cube 11 is constructed to have two glass prisms 13 and 15 with a highly reflecting stack 17 of alternating thin film layers sandwiched between the hypotenuses of the two glass prisms.

The indices of refraction of the glass and thin film wafers are chosen so that the incoming light (indicated by the block arrow at the top of FIG. 1) strikes each layer of the thin films at its Brewster angle. This causes no p polarization light to be reflected while passing through the stack. At each boundary between the thin films, some of the s polarization is reflected.

The thicknesses of the thin film layers are chosen so that the reflection coefficient is very high for the thin film stack. The result is that most of the s polarization gets reflected while all of the p polarization passes through.

The geometry of the cube 11 is arranged so that the angle between the reflected and the transmitted components is 90°.

Thus, as illustrated in FIG. 1, the incident light having the dual p and s polarization components passes through the inlet face 19 of the prism 13 and is transmitted to the stack 17.

The s polarization is reflected by the stack 17 and is transmitted out the outlet face 21 of the glass prism 13.

The p polarization passes through the stack 17 and is transmitted out the outlet face 23 of the glass prism 15.

In the use of the prior art beam splitting cube 11 (as shown in FIG. 1) the s polarization exits the beam-splitting cube at an orthogonal direction to the p polarization. In this event, the single polarized output beam of p polarization has only half of the intensity of the incoming light.

FIG. 2 is an isometric view of one embodiment of a polarizing component constructed in accordance with the present invention.

The polarizing component is indicated generally by the reference numeral 31 in FIG. 2.

The polarizing component 31 separates the s and p polarization components of a single beam of incoming light (indicated by the block arrow at the top of FIG. 2). The polarizing component 31 shown in FIG. 2 initially separates the s and p polarization components (of a single beam of incoming light) in basically the same way as the polarizing beam splitter cube 11 shown in FIG. 1.

However, the polarizing component 31 also recovers the reflected s polarized light and converts the recovered s polarized light to p polarized light to produce two, immediately adjacent, side by side, beams of polarized light at the outlet of polarizing component 31, as will be described in more detail below.

The polarizing component 31 shown in FIG. 2 is a basic unit of a polarization wafer assembly 60 which is shown in FIGS. 5 and 7 and which will be described in more detail below with reference to those two figures.

The polarizing component 31 shown in FIG. 2 utilizes structure like that described above with reference to the polarizing beam splitting cube 11 of FIG. 1 for separating the two orthogonal polarization components (s and p) of the incoming, incident light.

The incoming, unpolarized light is transmitted through an inlet face 35 of a parallelepiped 33. The parallelepiped 33 has a hypotenuse 22 facing a hypotenuse 20 of a glass prism 15. A stack 17 of alternating thin film layers is sandwiched between the hypotenuse surfaces 20 and 22.

The existing polarization light is transmitted directly through the stack 17 to the outlet face 23 of the prism 15 as a first beam 30 of p polarization light.

As in the prior art polarizing beam splitting cube 11 shown in FIG. 1, the stack 17 of alternating thin film layers reflects most of the s polarization at a 90° angle.

The parallelepiped 33 is formed with a second hypotenuse surface 37 which is disposed parallel to the hypotenuse surface 22.

A polarization rotator 39 on the surface 37 rotates the s polarization to p polarization. The polarization rotator 39 also serves as a total internal reflector (T.I.R.) surface.

The light exits the prism member 33 through an outlet face 41 as a second beam 32 of light in which all of the light in the second beam is aligned to the same p polarization as the light in the first beam 30.

The width of the first beam 30 and the width of the second beam 32 are the same. The combined width of the beams 30 and 32 is twice the width of the incoming beam passing through the inlet face 35.

The two output beams 30 and 32 are disposed side by side with no gap between the beams and propagate in the same direction.

The polarizing component 31 shown in FIG. 2 is a basic unit of a micropolarization wafer assembly 60 which is shown in FIGS. 5 and 7 and which will be described in more detail below.

The parallelepiped 33 may include an anti-reflection coating on the entrance face 35 and exit faces 23 and 41.

The parallelepiped 33 thus includes recovery and conversion means 37,39 for recovering the reflected s polarization light and for converting the recovered s polarization light to a p polarization light. The surface 37 functions as light directing means for directing the converted p polarization light to the light output means 41. Substantially all of the incoming unpolarized light entering the polarizing component is therefore transmitted through the polarizing component 31 and is output as two beams side by side beams 30 and 32 of single polarized light having a p polarization.

The two single polarized output light has an even distribution of intensity without any gap between the two output beams 30 and 32.

FIG. 3 is an isometric view of a second embodiment of a polarizing component 45 constructed in accordance with the present invention.

The polarizing component 45 shown in FIG. 3 is like the polarizing component 31 shown in FIG. 2 except that the hypotenuse and reflecting surface 37 no longer has a polarization rotator. This surface 37 is a total internal reflection (T.I.R.) surface. The s polarization light incident upon the surface 37 is reflected from that surface as s polarization light. The s polarization light is then changed to p polarization by a polarization rotator 47 at the exit face 41 of the prism member 33.

An attenuator 49 may also be positioned on the exit face 23 of the prism 15. The attenuator 49 compensates for the effect on the light intensity of the polarization rotator 47 so that the two beams 30 and 32 of single polarized light have the same intensity across the combined width of the two beams.

An attenuator 49 may also be used with the embodiments shown in FIG. 2 and FIG. 14.

FIG. 4 is an exploded, isometric view showing the polarizing component 45 of FIG.

FIG. 4 also shows how a beam-shaping microlens component 51 is operaively associated with the polarizing component 45.

The beam-shaping microlens component 51 and the polarizing component 45 comprise a unit cell 53 which is the basic building block of a micropolarization assembly shown in more detail in FIGS. 5 and 7.

The beam-shaping microlens component 51 contracts the incoming light beam to half its width and sends the light as a single beam 55 to the inlet face 35 of the polarizing component 45.

The beam-shaping microlens component 51 shown in FIG. 4 is a cylindrical-shaped condensing lens having a cylindrically curved top surface 57 and a cylindrical surface 59 in the lower side of the component 51. The width W of the top surface 57 is twice the width W/2 of the curved surface 59 of the lower side.

The beam-shaping microlens component may have anti-reflection coatings on its entrance face 57 and its exit face 59.

The cylindrical surface configuration of the beam-shaping microlens component 51 reduces the width W of the inlet beam (incident on the top surface 57) to the width W/2 of the cylindrically curved surface 59 so that all of the light incident on the top surface 57 is directed through the inlet face 35 of the polarizing component 15.

FIG. 5 is a fragmentary, isometric view, partly in cross section to show details of construction, of a polarization wafer assembly 60 and a beam-shaping microlens wafer 62 as assembled in accordance with one embodiment of the present invention.

FIGS. 8, 9 and 11 are isometric views of the three individual wafers 62, 65 and 67 which are assembled to provide the micropolarization wafer apparatus shown in FIG. 5. FIGS. 8, 9 and 11 are fragmentary views and are broken away in parts to show details of construction.

FIG. 8 shows the beam-shaping microlens wafer 62.

FIG. 9 shows the upper wafer 65 of the polarization wafer assembly 60.

FIG. 11 shows the lower wafer of the polarization wafer assembly.

Vapor depositions are applied to certain surfaces of the respective wafers 65 and 67 prior to assembling the upper and lower wafers of FIG. 9 and FIG. 11 together.

FIG. 10 is an elevation view, in cross section, taken along the line and in the direction indicated by the arrows 10—10 in FIG. 9.

Figure 12:
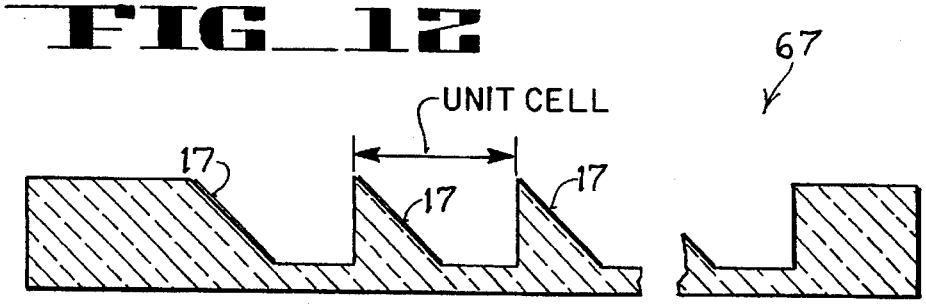
FIG. 12 is an elevation view, in cross section, taken along the line and in the direction indicated by the arrows 12—12 in FIG. 11.

FIG. 12 is an elevation view, in cross section, taken along the line and in the direction indicated by the arrows 12—12 in FIG. 11.

Figure 13:
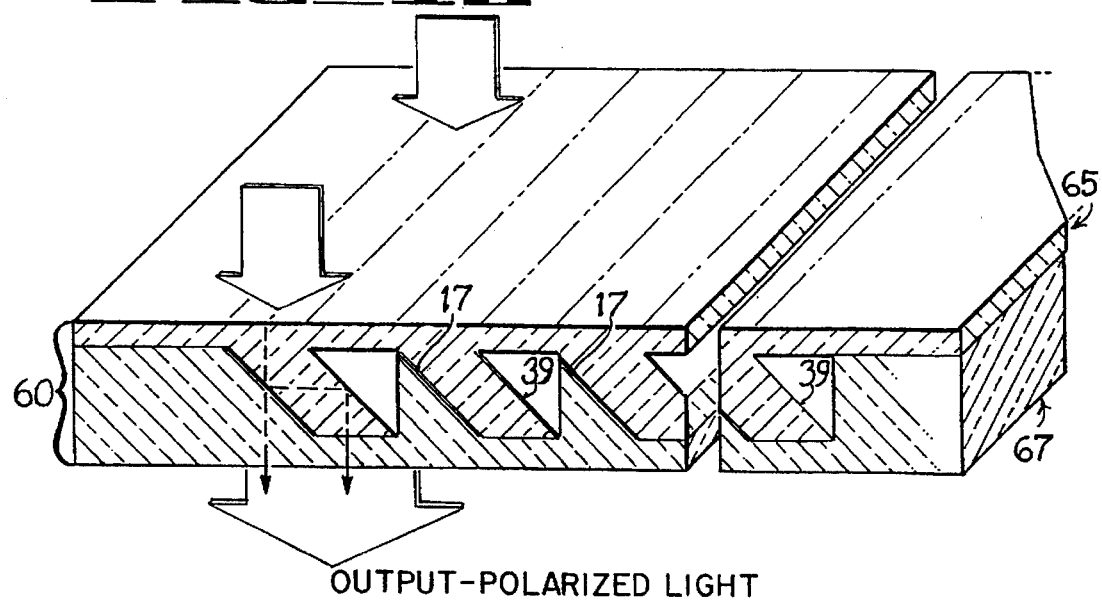
FIG. 13 is an isometric view showing how the upper wafer and the lower wafer shown in FIGS. 10 and 12 are assembled to produce the polarization wafer assembly.

FIG. 13 is an isometric view showing how the upper wafer 65 and the lower wafer 67 shown in FIGS. 10 and 12 are assembled to produce the polarization wafer assembly 60.

The micropolarization wafer apparatus shown in FIG. 5 is made up of a plurality of integrated, side by side, linearly extending, unit cells 53 (see FIG. 4) comprising a polarizing component (31 or 45 of FIG. 2 or FIG. 3) and the beam-shaping component 51 of FIG. 4.

Each polarizing component is fabricated in a polarization wafer assembly 60 and can be extended in one dimension and can be replicated N times in the orthogonal direction, thus yielding an L×NW wafer (see FIG. 6).

Each associated beam-shaping component 51 is fabricated in a beam-shaping wafer 62.

Each unit cell 53 (see FIG. 4 comprising the beam-shaping microlens component 62 and the polarizing component 60) extends linearly along the entire lengths of the wafers 62 and 60 (as can best be seen by viewing FIGS. 5 and 6).

As shown in FIG. 6 (which is an isometric view, looking at the topside, of a micropolarization assembly), a plurality of the unit cells 53 (each comprising a beam-shaping component 51 and an associated polarizing component) are arranged in N rows. Each associated beam-shaping polarizing component has a width W and extends the entire length L of the assembled wafers.

FIG. 7 is a fragmentary, enlarged, end view of a portion of the beam-shaping microlens wafer 62 and the polarization wafer assembly 60 shown in FIG. 5.

FIG. 7 shows details of how the polarized light is transmitted through one unit cell (a unit cell like the unit cell 53 illustrated in the exploded, isometric view of FIG. 4).

As can perhaps best be understood by viewing FIG. 7, the collimated, unpolarized light incident on the surface 57 of the beam-shaping microlens component is contracted to half its width as the light is transmitted through the beam-shaping microlens component and the outlet surface 59.

This beam of light of reduced width is then transmitted to the inlet face 35 of the polarizing component.

The p polarization light passes through the stack of alternating thin film layers 17 without reflection and is transmitted through the outlet face 23 as a first outlet beam 30 having a single p polarization. This outlet beam 30 has the same width as the width of the inlet face 35.

The s polarization light is reflected by the thin film stack 17 and is then reflected again by total internal reflection (T.I.R.) from the polarization rotator surface 39. The reflection and the polarization rotator 39 cause the s polarization to rotate to p polarization.

This single p polarization light is then transmitted as a second output beam 32 through the outlet face 41. The width of the second output beam 32 is the same as that of the first output beam 30 so that the combined width of the two beams is equal to the width of the inlet surface 57 of the associated beam-shaping component in the beam-shaping microlens wafer 62.

There is no gap between the output beams 30 and 32.

Thus, upon exiting the polarization wafer assembly 60, the width of the light is expanded to its original size.

All of the incoming unpolarized light is transformed to outgoing single polarized light of the same physical extent.

The intensity of the outgoing light is substantially the same as the intensity of the incoming light, because substantially all of the light is transmitted through the micropolarization assembly without loss. As noted above in reference to FIG. 3, an attenuator 49 may be used to compensate for any small intensity differences between the output beams.

The selection of optical materials and optical design is dependent upon the particular wavelength band for which the polarization apparatus is used.

In the embodiment shown in FIG. 14 the upper wafer 65 and the lower wafer 67 are constructed to have the highly reflecting stack 17 of alternating thin film layers disposed at an angle which is ninety degrees from that of the FIG. 5 embodiment.

The reflected s polarization light is converted to p polarization light by a quarter wavelength phase plate 73 and a total internal reflection (T.I.R.) mirror surface 75.

This converted p polarization light then passes through the thin film layers 17 and is reflected again by a total internal reflection (T.I.R.) surface 77 so that the reflected light exits the unit cell as the second beam 32 of single polarization light.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A micro polarization wafer apparatus for converting substantially all incoming collimated unpolarized light to outgoing collimated single polarized light of a substantially uniform intensity, so as to be suitable for use in illuminating a bit mapped flat panel display, and over substantially the same area as the incoming collimated unpolarized light, said apparatus comprising, polarization wafer means for receiving a plurality of single beams of unpolarized light through a light input and for converting each single beam of unpolarized light to two immediately adjacent side by side beams of light having a single polarization for transmission through a light output, said polarization wafer means comprising a first, integrally formed, polarization wafer and a second, integrally formed, polarization wafer, said first and second wafers interfitting with one another to provide a thin, flat polarization wafer assembly, said polarization wafer means comprising a plurality of unit cells disposed side by side, each unit cell comprising, (a)
beam splitting means for receiving the single beam of unpolarized incident light at the light input and for separating p and s polarization components of the beam of light as received at the light input, said beam splitting means having a glass prism on said first polarization wafer with a first hypotenuse surface, a parallelepiped on said second polarization wafer with a second hypotenuse surface disposed parallel to said first hypotenuse surface, and a stack of alternating thin film layers sandwiched between the hypotenuse surfaces of the prism and the parallelepiped for transmitting the existing p polarization light directly through the apparatus to the light output as a first output beam of p polarization light and for reflecting the s polarization light at a 90° angle from the direction of transmission of the first beam of p polarization light, and (b)
recovery and conversion means for recovering the reflected s polarization light and for converting the recovered s polarization light to p polarization light, said recovery and conversion means including light output means and a light directing means for directing the converted p polarization light to the light output means as a second beam of p polarization light in parallel with and immediately adjacent to said first beam of p polarization light, whereby each unit cell transmits substantially all of the light received at the input to the output without loss and produces the two beams of single polarized light at the output without a gap between the beams, said recovery and conversion means including a third hypotenuse surface on the parallelepiped spaced from and disposed parallel to said first and second hypotenuse surfaces, said third hypotenuse surface having a polarization rotator which rotates the s polarization to p polarization and which also serves as a total internal reflection surface, said parallelepiped having an exit face and including an antireflection coating on said exit face, said glass prism having a first exit face and including attenuator means on said first exit face for compensating for the effect on the light intensity of said polarization rotator so that the two beams of single polarized light at the output means have the same intensity across the combined width of the two beams, each unit cell having a rectangular configuration with the length of the unit cell extending along substantially the entire lengths of the first and second polarization wafers and with the width of the unit cell equal to the combined width of the two immediately adjacent side by side beams at the output of the unit cell, each unit cell having an inlet face on the glass prism which is one half the combined width of the two immediately adjacent side by side beams at the output of the unit and including beam shaping microlens means for shaping a single beam of input light to a condensed beam of input light which is one half of the width of said single beam of input light and for directing all of the condensed beam of input light through said inlet face, said beam shaping microlens means including an integrally formed microlens wafer for producing the single beam of input light at each said inlet face of each unit cell, said beam-shaping microlens wafer comprising a plurality of cylindrical condensing microlenses with each cylindrical condensing microlens aligned with a related unit cell and extending along the entire lengths of the first and second polarization wafers, each cylindrical condensing microlens comprising an outlet having a width equal to the width of said inlet face of the unit cell and comprising an inlet having a width equal to the combined width of the two immediately adjacent side by side beams at the output of the unit cell so that incoming collimated unpolarized light at the inlet of the beam-shaped microlens wafer is converted to outgoing collimated single polarized light at the outlet of the second polarization wafer and so that the outgoing single polarized light has a substantially uniform intensity, so as to be suitable for use in illuminating a bit mapped flat panel display, and over substantially the same area as the incoming unpolarized light without any gaps in the outgoing single polarized light.

* * * * *